May 21, 1935.  R. H. WAINFORD  2,001,755
MECHANICAL MOVEMENT
Filed April 14, 1933  2 Sheets-Sheet 1
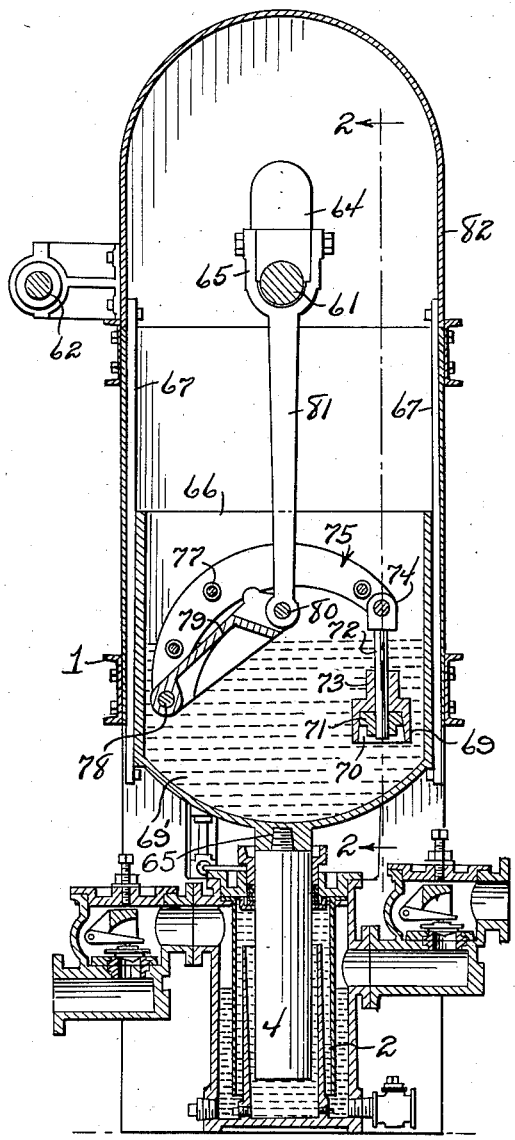
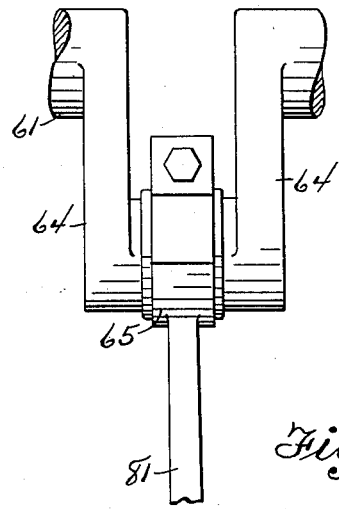
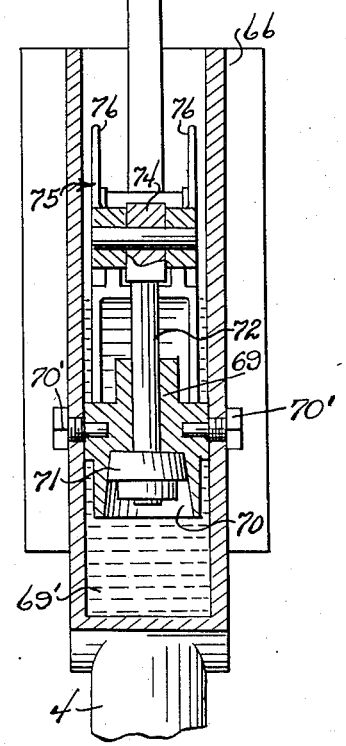
Richard H. Wainford Inventor
By
Attorney

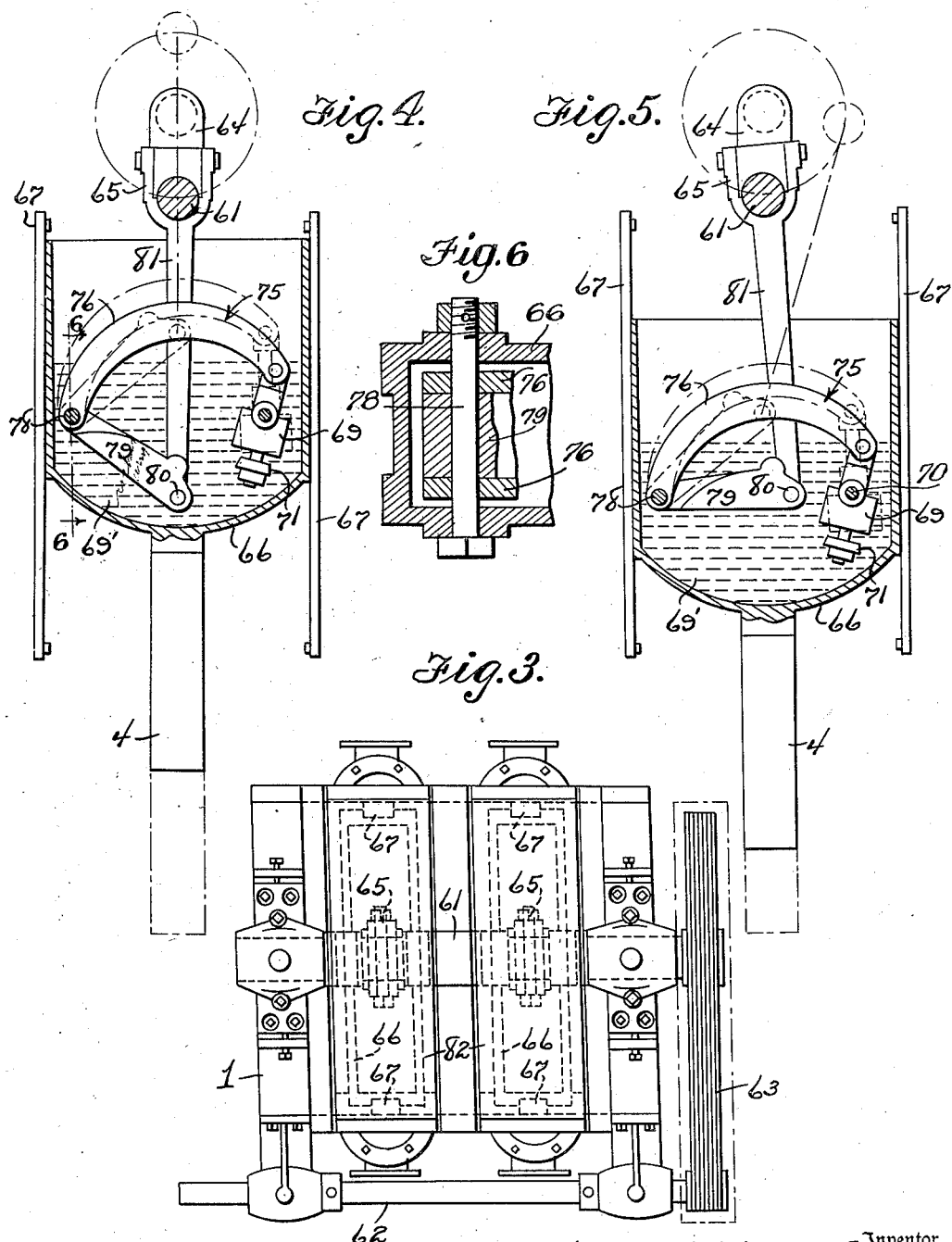

Patented May 21, 1935

2,001,755

UNITED STATES PATENT OFFICE 2,001,755

MECHANICAL MOVEMENT

Richard H. Wainford, Trenton, N. J.

Application April 14, 1933, Serial No. 666,193

8 Claims. (Cl. 185—7)

This invention relates to mechanical movements for operating vertically reciprocatory elements, such as pump pistons or other like elements, of the variable stroke, variable delivery or motion transmitting type, and one object of the invention is to provide a novel and improved construction of mechanical movement which may be employed with a saving of time and power or where a variable quantity motion transmitting or pressure delivery action is required or desirable in order to prevent damage to working parts or to delivery receptacles.

Another object of the invention is to provide a mechanical movement of this character in which working power is required only to raise the reciprocatory element on its idle or return stroke and the working stroke operation is performed by dead weight of a head member acting by gravity to impart working power to the reciprocatory element on such stroke.

Still another object of the invention is to provide a mechanical movement of this character in which a novel motion transmitting connection between the reciprocatory element and its actuating and controlling means is provided to secure certain idling and motion transmitting movements such that when the resistance to the working stroke of the reciprocatory element due to pressure in a service or delivery line or other opposing resistance equals the dead load of the reciprocatory element a static condition will be set up, whereby the back pressure will balance the dead load of the pressure and effect the automatic stoppage of the reciprocatory element to prevent damage to the working parts or to a receptacle to which material is to be delivered thereby, as in case where the reciprocatory element comprises the working piston of a pump.

Still another object of the invention is to provide a mechanical movement of the character described in which the dead load represents both the working pressure and also the maximum pressure, so that the necessity of using a safety valve or safety devices to give a pressure relief action is avoided.

Still another object of the invention is to provide a mechanical movement embodying a motion transmitting connection and cushioning means whereby an easy working motion of the reciprocatory element is obtained and shocks and jars prevented.

Still another object of the invention is to provide a cross-head forming part of the motion transmitting connection which serves as a weighted head or dead load mass acting on the reciprocatory element and also as a housing for other working parts of such connection and as a reservoir for lubricant, whereby a compact type of means of this character is produced.

Still another object of the invention is to generally simplify and improve the construction and increase the practical efficiency of devices of this character.

With these and other objects in view, the invention consists of the novel features of construction, combination and arrangement of parts, hereinafter fully described and claimed, reference being had to the accompanying drawings, in which:—

Fig. 1 is a vertical transverse section through a variable stroke variable delivery pump, showing the application of my improved mechanical movement thereto for driving a plunger thereof.

Fig. 2 is a section on line 2—2 of Fig. 1.

Fig. 3 is a top plan view of the pump in which a pair of cylinders and plungers are employed, each plunger being operated by a mechanical movement embodying my invention.

Figs. 4 and 5 are sectional views showing the working movements of the parts of the motion transmitting mechanism.

Fig. 6 is a detail section taken substantially on line 6—6 of Fig. 4.

Referring now more particularly to the drawings, 1 designates a frame structure which may be the frame structure of a pump to which the invention is shown in the present instance applied for transmitting motion to a vertically reciprocatory plunger 4 operating in a cylinder 2 suitably supported on the frame structure. Any number of plungers movable in coacting cylinders may, of course, be employed in the pump or other working structure, each of which plungers may be operated by mechanical movements embodying my invention from a common primary source of power.

Journaled in bearings at the top of the frame is a crank shaft 61 and a countershaft 62, which countershaft is designed to be driven from any suitable primary source of power, and said shaft transmits power to the crank shaft 61 through a suitable type of belt connection 63. The shaft 61 is provided with cranks 64 equal in number to the plungers to be driven, and these cranks may be arranged at suitable angles apart for operating the plungers on their reverse strokes in proper timed accord with each other. The means for transmitting motion from each driving crank 64 to the plunger actuated thereby comprises a novel construction of motion transmitting mechanism embodying my invention. As shown, each piston is detachably connected at its upper end, as at 65, with the base of a cross-head member 66 mounted to reciprocate vertically on guides 67 carried by the pump frame 1. The cross-head 66 is weighted and constitutes a driving head loading the plunger to a predetermined dead weight, which fixes the working pressure required in the service line. The action of the pump depends upon the working movement of the plunger by this load weight under the force of gravity, the crank shaft and connecting means between the same and the cross-head, forming part of such motion transmitting mechanism, being employed only to lift the weighted mass to return the plunger to normally retracted position after each expression action. On each upward movement of the plunger an amount of the stock material is drawn in through the suction valve, and on the downward movement of the plunger this material is forced out into the service line through the discharge valve. When the pressure in the service line equals the dead load, a static condition is set up and the pump automatically ceases to act, the pressure balancing the dead load of the plunger. The dead load represents not only the working pressure, but also represents the maximum pressure and therefore the need of a safety valve is avoided. In accordance with my invention, the load weight on the plunger is prearranged or predetermined so as to actually represent the maximum of pressure obtained, thus absolutely relieving any installation from risk of over pressure to bursting pressure and thereby automatically giving full and complete safety of operation without employing safety relief valves or other devices to guard against over pressure.

Each cross-head 66 is in the form of a hollow body or receptacle of rectangular cross-section and serves as a reservoir for a store of oil or other suitable lubricant 69' and as a casing for the coacting elements of the motion transmitting mechanism. These elements consist of a fulcrum or pivot member 69 having journaled upon pivot pins or trunnions 70' mounted in the side walls of the cross-head to adapt said trunnion member to have a rocking motion thereon. The trunnion member is in the form of a cylinder having a conical cushioning chamber 70 opening through its base and adapted to receive a correspondingly shaped cushioning piston 71 movable into and out of said cushioning chamber. The piston is fastened to the lower end of a stem 72 reciprocably movable in a guide boss 73 formed on the cylinder 69, and the upper end of this stem terminates in a head 74 which is pivotally coupled to one end of a swinging beam 75 comprising a pair of spaced plates 76 connected by distance bolts 77, such end of the beam thus being slidably and pivotally coupled by the cylinder and piston to the cross-head. The opposite or free end of the beam 75 is pivotally connected by means of a pin or bolt 78 to the cross-head 66, and on this pin or bolt is pivotally mounted the outer end of a rocker arm 79 which is pivotally coupled at its inner end, as at 80, to the lower end of the connecting rod 81 for transmitting lifting motion to the cross-head from its actuating crank 64 on the crank shaft 61. The parts referred to within the cross-head 66 form a part of the dead weight of the cross-head and are housed and protected from injury therein and are more or less submerged in the oil 69 so as to be effectually lubricated thereby. The rocker arm 79 is adapted alone, and in conjunction with the beam 75, to permit of certain lost motion movements and periods in the orbit of rotation of the driving crank 64 and in the movements of the connecting rod 81, and the function of the member 79 is to form a rocking support which permits the beam 75 to rock and adjust or accommodate itself to the different arcs of motion of the arm 79. In these movements the beam, through the stem 72, has also a sliding lost motion connection with the rocking fulcrum member 69, during which the piston 71 moves in and out of the cushioning chamber 70, thus establishing certain retarding and cushioning actions to ensure an easy working motion of the parts and a cushion action to absorb all shocks and jars during the final portion of the working traverse of the cross-head 66. It will be understood that the piston 70 fits the cushioning chamber with just sufficient looseness to allow flow of oil into and out of the chamber and past the piston for a combined checking or retarding and cushioning action, and that the piston has a range of movement permitting it to move downwardly entirely out of the chamber, which range of movement is governed and regulated by contact of the head 74 with the boss 73. Hoods 82 may be provided to enclose the crank portions of the shaft and the belt driving connections, if desired.

Figs. 1, 4 and 5 illustrate the action of the pump, Fig. 1 showing the plunger at the end of a full stroke, Fig. 4 showing in dotted and full lines the plunger at the end of its downstroke and upstroke, respectively, and showing an idling action, and Fig. 5 illustrating in dotted and full lines, respectively, the plunger at the end of its downstroke and in mid-position or half stroke idle and half pumping. Referring particularly to Fig. 1, it will be understood that at the limit of force stroke of the plunger, which has been forced down to express the charge in the cylinder by the weight of the cross-head or weight member, the crank and connecting rod and parts of the motion transmitting mechanism move from the position shown in dotted lines in Fig. 4 to that shown in dotted lines in Fig. 5, during which the segmental beam 75 and rocker arm 79 swing downward, as the cross-head descends, from the dotted line position shown in Fig. 4 to the full line position shown therein, on an idling action, in which idling action, and during the movement of the crank between its uppermost and lowermost positions, the force of the crank and connecting rod are not transmitted to the plunger, which, through the pivotal lost motion connection between the cross-head and the connecting rod furnished by the motion transmitting mechanism, may move downwardly to a greater or less degree, according to the resistance in the service line, regardless of the action of the crank and connecting rod. By this means it will be seen that when the pressure in the service line equals the dead load, which represents the maximum working pressure, a static condition will be set up whereby any further forcing motion of the plunger is arrested and the pump automatically ceases to act, the pressure balancing the dead load of the plunger. The forcing pressure under the force of gravity is thus automatically rendered active in strict relation to the degree of the release of pressure in the service line, the pump smoothly and evenly responding to such release of pressure and the plunger being arrested in its forcing action completely when the pressures are balanced, thus preventing over pressure or bursting pressure in the service line and obviating the necessity of employing safety relief valves or other devices to guard against over pressures.

On the return of the cross-head at the end of a working stroke from the position shown in Fig. 1 to that shown in dotted lines in Fig. 5, the rocker arm 79 is carried upward by the connecting rod 81 on the travel of the crank from its lowest to its highest position in its orbit of movement until the arm contacts with the beam at the end of an idle motion, and thereafter the beam moves upward with the arm and rocks upon its fulcrum 69 to accommodate itself to the arcs of motion of the rocker arm and wrist pin 80, thus transmitting motion to the cross-head 66 to raise the same to the position shown in Fig. 5. During this operation the stem 72 has a sliding motion through the fulcrum member 69, thus moving the piston 71 out of the retarding and cushioning chamber 70. On the next half revolution of the crank from its highest to its lowest position, the connecting rod and cross-head, together with the beam 75, move downward at a regulated speed while the cross-head is moving downward at a rate of speed varied according to the resistance in the service line, and which is permitted by reason of the pivotal, sliding and lost motion actions permitted by the connecting mechanism. As the cross-head nears the limit of its downward movement and the connecting rod assumes a substantially straight line position and adjusts the beam and rocker arm accordingly, the fulcrum member 69 is rocked back to a vertical position and the stem 72 drawn upward to force the piston 71 into the cylinder 70, whereby a retarding and cushioning action is obtained at this time to prevent shocks and jars and to ensure an easy motion of the parts at the end of their working stroke. Fig. 5 shows in full lines a position between the two positions shown in full lines in Figs. 1 and 4, that is to say, on a half stroke in the pumping or half stroke idling position in the up or down travel of the cross-head and plunger.

From the foregoing description, taken in connection with the accompanying drawings, the construction and mode of operation of my improved mechanical movement will be readily understood, and it will be seen that it provides a simple, reliable and efficient type of variable stroke motion transmitting means, applicable to pump plungers or other reciprocatory parts designed to have a variable stroke action, whereby the working range of the reciprocatory part will be automatically varied according to the resistance encountered by it in its working movement to cushion said part on such working movement and to prevent damage thereto or to other parts of the apparatus embodying it or to parts receiving motion from or supplied with material by the reciprocatory part. In the particular example shown, in which the device is used for transmitting motion to the plunger of a variable stroke, variable delivery pump it will be seen that the discharge of the pump will be automatically regulated and varied by the demand upon it, governed by the presence or absence or degree of resistance in the service line, so that all danger of over supply or over pressure is effectually overcome. The pump, therefore, will be found of great advantage over positive stroke pumps in pumping various stock materials in such manner as to prevent over pressure, as, for example, in the operation of plunger presses, where it is desirable to have the forcing pressure cease at a certain time in order to prevent bursting of the bags, which my invention will accomplish in a most thorough and effectual manner. The pump may also be used in pumping materials where the demand on the pump varies and there is liability of over pressure in the use of positive stroke pumps. By means of my construction, in which the dead load of the plunger represents the working pressure, it will be evident that the pump may be designed for prearranging or predetermining the working pressure representing the maximum of pressure obtainable, ensuring any installation relief from risk of over pressure to bursting pressure of parts.

What I claim is:—

1. A mechanical movement comprising a vertically reciprocatory element, a motor driven crank shaft, a connecting rod coupled thereto, a weight member for gravitally impelling the reciprocatory element in one direction, a beam pivotally connected at one end to the weight member and pivotally and slidably connected at one end to the weight member for a limited independent swinging motion with respect thereto, a rocker arm pivotally connected at one end to the weight member and at its opposite end to the connecting rod and movable by said rod to lift the beam, and a retarding and cushioning means associated with said sliding and pivotal connection and comprising a rocker member having a cushioning chamber therein and a piston movable into and out of said chamber.

2. A mechanical movement comprising a vertically reciprocatory element, a hollow cross-head formed with a lubricant containing reservoir and constituting a weight member for gravitally impelling the reciprocatory element in one direction, a motor driven crank shaft, a connecting rod coupled thereto, a curved beam pivoted at one end to the cross-head, a pivotal and cushioning device connecting the other end of said beam with the cross-head and comprising a rocker member on the cross-head having a cushioning chamber therein, a piston slidable into and out of said chamber, and a stem carrying said piston and to which said end of the beam is coupled, and a rocker arm pivoted at one end to the cross-head and at its opposite end to the connecting rod.

3. In a mechanical movement, a vertically reciprocatory plunger, a vertically reciprocatory weight member connected to the plunger and serving as a means for impelling the plunger on its down stroke, a beam fulcrumed at one end to the weight member, a sliding and pivotal limited lost-motion connection between the opposite end of the beam and the weight member, a crank shaft, a rocker arm pivotally mounted on the weight member for upward and downward swinging movements relative thereto and to the beam and arranged so that on its upward movement it will engage and raise the beam and weight member and thereby operate the plunger on its upstroke, and a connecting rod between the crank shaft and the opposite end of the rocker arm whereby said rocker arm is operated.

4. In a mechanical movement, a vertically reciprocatory plunger, a vertically reciprocatory hollow weight member forming an oil chamber and serving as a means for impelling the plunger on its down stroke, a beam fulcrumed at one end to the weight member, a sliding and pivotal limited lost-motion connection between the opposite end of the beam and the weight member, a crank shaft, a rocker arm pivotally mounted on the weight member for upward and downward swinging movements relative thereto and to the beam and arranged so that on its upward movement it will engage and raise the beam and weight member and thereby operate the plunger on its upstroke, and a connecting rod between the crank shaft and the opposite end of the rocker arm whereby said rocker arm is operated.

5. In a mechanical movement, a vertically reciprocatory plunger, a vertically reciprocatory weight member connected to the plunger and serving as a means for impelling the plunger on its down stroke, a beam fulcrumed at one end to the weight member, a rocker element carried by the weight member, a member pivoted to the opposite end of the beam and slidably and pivotally connected with the weight member, whereby the beam is mounted to have a limited degree of swinging movement on the weight member, a crank shaft, a rocker arm pivotally mounted on the weight member for upward and downward swinging movements relative thereto and to the beam and arranged so that on its upward movement it will engage and raise the beam and weight member and thereby operate the plunger on its upstroke, and a connecting rod between the crank shaft and the opposite end of the rocker arm.

6. A mechanical movement comprising a vertically reciprocatory element, a vertically movable weight member for gravitally impelling the reciprocatory element on its downstroke, a motor driven crank shaft, a beam pivoted at one end to the weight member, a sliding and pivotal lost-motion connection between the opposite end of the beam and said weight member adapting the beam to have a limited swinging movement in a vertical plane independent of the weight member, a motion transmitting member pivotally connected to the weight member for swinging movement in a vertical plane to a greater degree than that of the beam and arranged for movement into and out of engagement with the beam, and a connecting rod coupling said motion transmitting member to the crank shaft for swinging the beam upward and lifting the weight member during a portion of the orbit of rotation of the crank shaft and then releasing the beam and moving out of the path of downward movement thereof to permit the weight member to drop by gravity to communicate downward motion to the reciprocatory element.

7. A mechanical movement comprising a vertically reciprocatory element, a weight member for impelling said element by gravity on a downward working slope and lifting the same on its return stroke, a beam pivoted at one end to the weight member, a sliding and pivotal lost-motion connection between the opposite end of the beam and the weight member adapting said beam to have a limited swinging movement in a vertical plane independent of the weight member, a rocker arm pivoted to one end of the weight member and movable upwardly to engage the beam and lift the same and the weight member and downwardly to release the beam and permit the weight member to descend by gravity, a crank shaft, and a connecting rod between the crank shaft and rocker arm for imparting motion to said rocker arm and controlling the movements thereof in its lifting and releasing actions.

8. A mechanical movement comprising a reciprocatory element, a weight member connected thereto for raising said element and gravitally imparting a downward working movement thereto, a crank shaft arranged above the weight member, a beam pivoted at one end to the weight member, a sliding and pivotal connection between the other end of the beam and the weight member to permit said weight member to have a limited movement in a vertical plane independent of the weight member, cushioning means associated with said slidable and pivotal connection, a rocker arm pivoted at one end to the weight member for up and down swinging movements to lift the beam and the weight member and to release the beam and permit gravital downward movement of the weight member, and a connecting rod coupling the shaft to the rocker arm to move the same upward during a portion of the revolution of the crank shaft to engage and transmit upward movement to the weight member and then during a remaining portion of the movement of the crank shaft to move the arm downward a degree to release the beam and permit the weight member to drop on its downstroke.

RICHARD H. WAINFORD.